United States Patent Office

3,351,275
Patented Nov. 7, 1967

3,351,275
ARRANGEMENT FOR DETERMINING AND
ANALYSING SHIP'S STABILITY
Olgierd Jabłoński, ul. Politechniczna 3 m 5,
Gdansk 6, Poland
Filed Sept. 14, 1965, Ser. No. 487,275
Claims priority, application Poland, Sept. 14, 1964,
P 105,716
9 Claims. (Cl. 235—61)

ABSTRACT OF THE DISCLOSURE

Apparatus having first and second inputs for the entry of data respectively relating to vessel displacement and elevation of the vessel center of gravity for a given loading condition, and cams coupled to the inputs for controlling a band indicator on a graph to display a stability curve for the given loading conditions.

---

This invention relates to computations for determining and analysing a ship's stability, and more particularly to apparatus and methods for operational use by ships' masters and owners.

The invention is concerned in particular with an arrangement for graphically tracing changes in ship stability due to the effect of changes in given loading conditions in quantitive as well as in spatial distribution of cargo.

The invention in mechanizing stability computations does not encompass the preliminary operations connected with numerically predicting initial parameters of the loading conditions, i.e., displacement $\Delta$ and elevation of the system's gravity center KG. For such preliminary operations, there may be employed devices such as, for example, the devices shown in Polish Patents 45,044 and 493,740 and in Polish patent declaration No. P-102,669. Used together with devices of the latter type, the arrangement according to the invention provides a complete mechanization of all computations required for operational supervision and safety relative to vessel stability.

An embodiment of the invention is shown diagrammatically in the accompanying drawing wherein:

FIGURE 1 diagrammatically represents the constructional arrangement of a complete system;

The arrangement according to the invention achieves its purpose by means of two mechanical adjustments, such as adjustments on the actual displacement of a given vessel load $\Delta(T)$ tons, and on the respective elevations of the centers of gravity $KG(m)$ for a given distribution of loads.

In accordance with both of the above mentioned adjustments, the arrangement according to the invention indicates:

(a) On a main (middle) indicator screen, the course i.e., the form of the respective curve of the vessel's static stability arms for the given loading conditions, this being the graphic diagram of the function type:

$$GZ = f(\theta, \Delta, KG)$$

In this equation the symbols denote the following:

GZ—arm of static stability,
$\theta$—angle of vessel's transverse list,
$\Delta$—vessel's displacement,
KG—elevation of resultant gravity center of the loaded vessel in relation to keel point K.

(b) On the scale of a right indicator screen, in the adjusted value of vessel's displacement $\Delta(T)$ and the following values corresponding to individual displacements: vessel's draft $T(m)$; vessel's deadweight $DW(T)$; displacement in fresh water $\Delta_1(T)$; longitudinal position of the center of buoyancy $X_\Delta(m)$; unitary moment of trim $M_j(Tm)$; limiting elevation of gravity center in regard of the obliging minimum stability criteria $KG_{max}(m)$, and data of the character of direct displacement's function.

(c) On the scales of the left indicator screen, the adjusted value of elevation of the vessel's gravity center $KG(m)$ and the metacentric height for the given loading conditions $GM(m)$.

Figure 1:
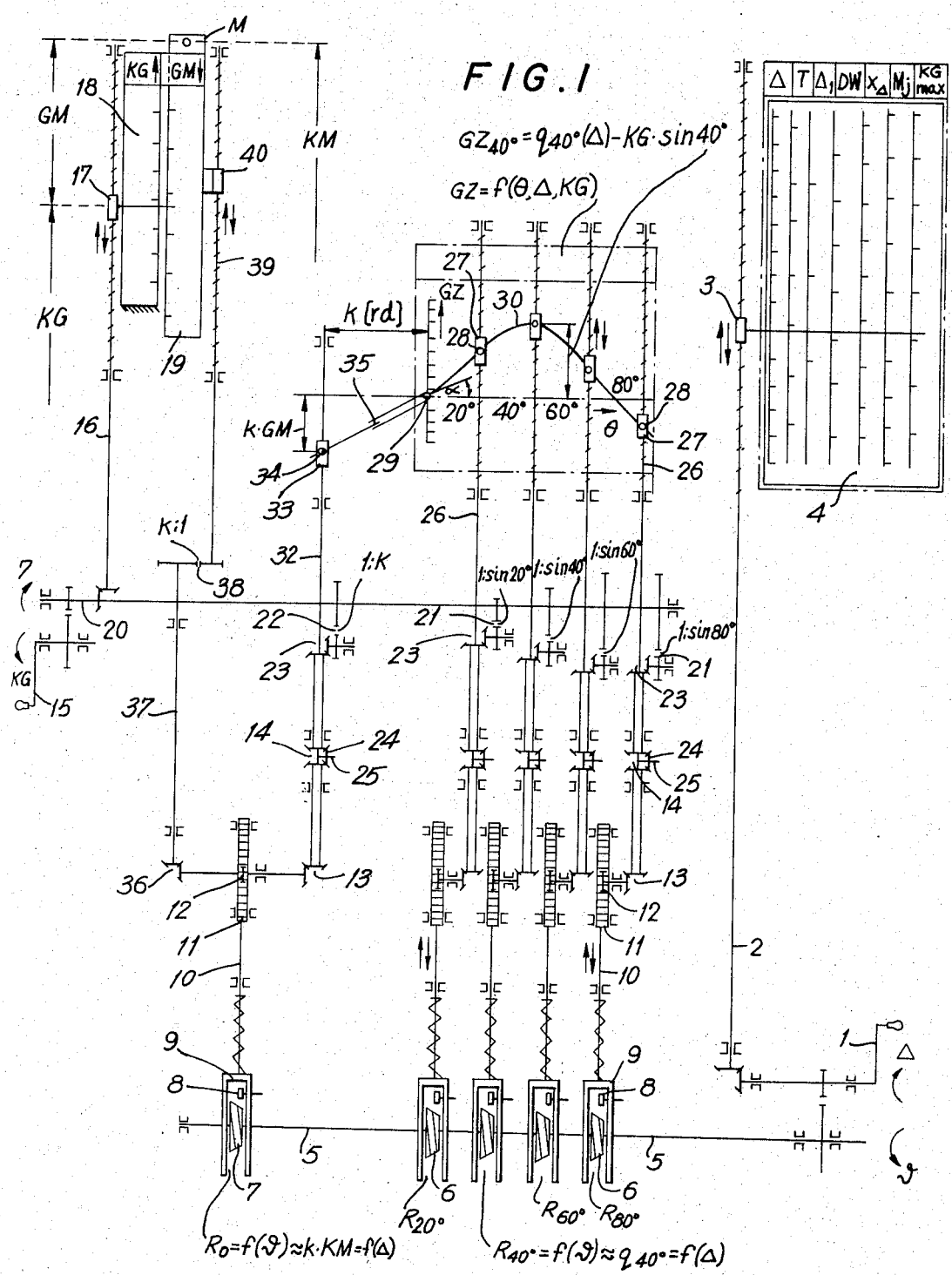

The constructional system of the arrangement according to the invention in FIG. 1 is purposely adjusted for plotting the above mentioned stability curve by means of four transitory ordinates (GZ) of this curve corresponding to lists of the vessel by angles: $\theta = 20°, 40°, 60°$ and $80°$. In the solution according to the invention there is also controlled the direction of the curve in question from the point $\theta = 0$ i.e., the inclination angle $\alpha$ of the tangent to the stability curve in relation to axis of abscissae of the co-ordinate system.

The above mentioned controlled direction of the motion also provides the possibility of correct projection of the form of the stability curve in such cases, when in the arrangement according to the invention there will be applied relatively large—for instance every $20°$ or $25°$—gap angles between the individual transitory ordinates.

A handle 1 is provided for adjusting the arrangement according to the invention on actual displacements of vessel. Its rotations are transmitted on two shafts 2 and 5. Shaft 2 provides for the corresponding sliding of pointer 3 along the functional scales 4 of the right indicator screen.

Shaft 5 provides for rotating a set of radial cams. This set has a group of radial cams 6 for projecting in the system of polar co-ordinates (R, $\vartheta$) the value corresponding to the selected vessel's transitory angle of list, i.e., the so-called cross-curves of the given vessel. As is known, the cross-curve of the given vesel's angle of list projects by it course the dependence of the arm of form stability $q\theta$ from the displacement of vessel $\Delta$.

As stated above, FIG. 1 shows an example of a solution operating with four transitory cross-curves:

$$q_{20°} = f(\Delta);\ q_{40°} = f(\Delta);\ q_{60°} = f(\Delta)\ \text{and}\ q_{80°} = f(\Delta)$$

Radial cam 7 serves for projecting the so-called KM curve i.e., the dependence of the transverse metacenter elevation upon the keel. This curve in particular projects by its radii $R_0 = f(\vartheta)$ the $k.KM(\Delta)$ values; the meaning of the $k$ coefficient appearing above will be explained further on.

Figures 2, 3:
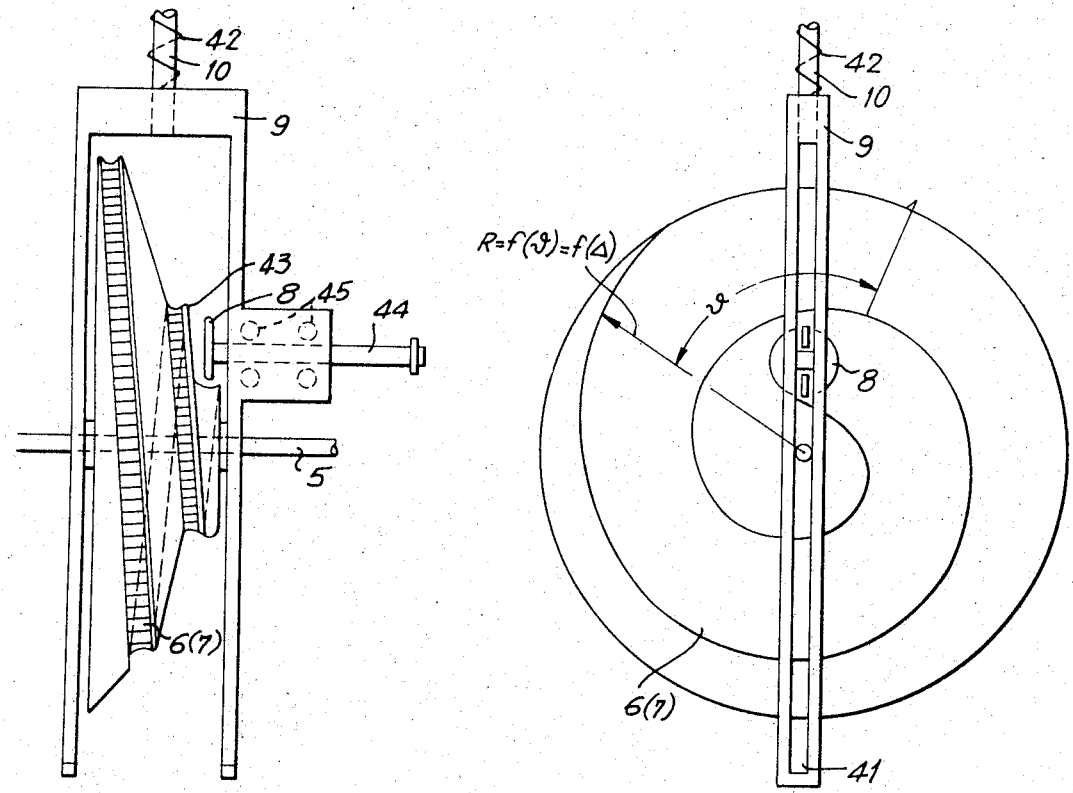
FIGURE 2 illustrates one of the elements in the form of a radial cam in front view.
FIGURE 3 shows the cam in side view.
Figure 4:
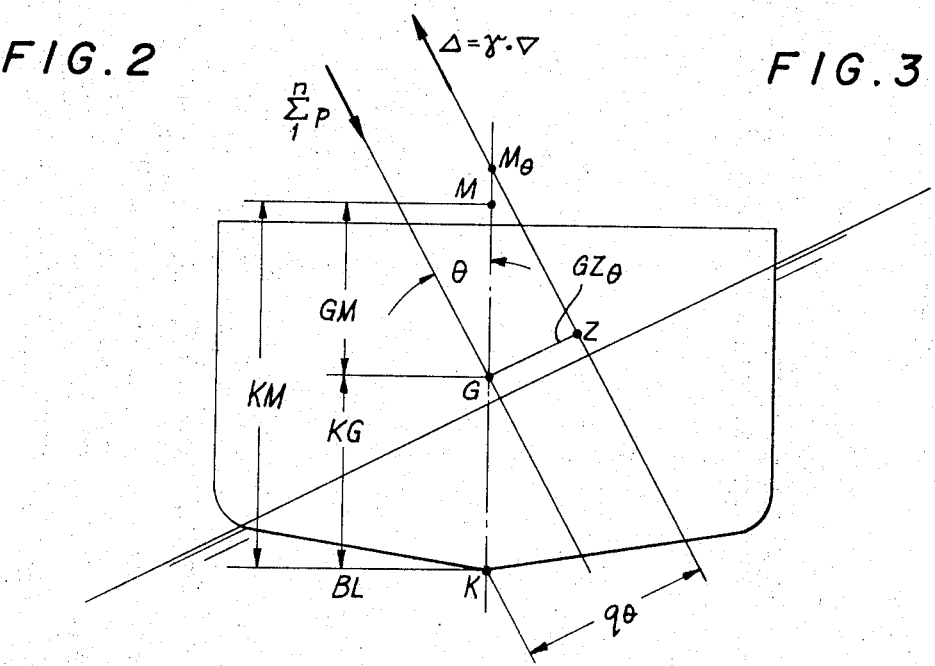
FIGURE 4 illustrates the main symbols used in the present description relative to a vessel's cross-section.

The application of multiturn radial cams shown in FIGS. 1 and 2 offers a substantial reduction of dimensions of the arrangement according to the invention and reduces the angle of inclination of the cam ways in relation to the cam follower's rollers 8.

Each of the radial cams 6 and 7 under the effect of its angle settings $\vartheta$ slides the toothed bars or racks 11 by means of rollers 8, frames and pull rods 10. The sliding movements of the toothed bars 11 are proportional to the adjusted displacements ($\Delta$) applied to handle 1 as effected by the individual radial cams. The toothed bars 11 by their own sliding movements rotate the toothed wheels 12, which by means of conical gears 13 perform rotary transmissions to the adding gears 14.

For the second kind of adjustment of the arrangement according to the invention (i.e., according to the actual elevation of the vessel's gravity center KG) the handle 15 is provided, of which rotations $\eta$ are transmitted to two transmission shafts 16 and 20. Shaft 16 serves for a corresponding adjustment of pointer 17 in relation to the stationary scale 18 (referring to the value KG) and to the sliding scale 19 with the scale of value GM.

The second shaft 20 serves for rotating a system of toothed gears. This system has a group of pairs of gear toothed wheels 21, and a pair of gear toothed wheels 22. In group 21, the pair of gear wheels in position of the cross-section of the stability curve $\theta=20°$ will be converting the rotations of the shaft 20 proportionally to KG into rotations proportional to the product $KG.\sin 20°$. In position $\theta=40°$, conversion will be into rotations proportional to $KG.\sin 40°$, etc.

The pair of gear toothed wheels 22 will convert the rotations $\eta$ into values proportional to the product $k.KG$, where $k$ expresses in radians the actual distance of the shaft 32 from the beginning of the co-ordinate system to the stability curve.

Each pair of toothed wheels in the above mentioned gear system 21 and 22 performs by means of conical transmission wheels 23 rotary transmissions to the additional gears 14. This means that to each of the gears 14 come two independent rotary transmissions. One of them comes from the radial cams 6 and 7, thus also from the handle 1, which relates to the vessel's displacement; the second one comes from the toothed gears 21 and 22, and thus also from the handle 15, which relates to elevation of the vessel's gravity center KG. Both transmissions are transmissionally so organized that the first rotations, associating the positive increase of value, go to the gears 14 with directions reverse to the second rotations, i.e., associating the positive increase of the value KG.

Planet wheels 24 applied in the gears 14 will then by means of their envelope cycles project values proportional to the difference between transmissions which are the displacement functions ($\Delta$) and between transmissions which are functions of the elevation of the gravity center (KG). The resultant rotations from each gear 14 will particularly be equal to a half of the difference of these transmission rotations. Planet wheels 24 are mounted on radial axles 25 and rotate the resultant shafts 26 and 32.

A result of both transmissions on the arrangement ($\Delta$ and KG) is that the individual resultant shaft of group 26 will be rotated by values proportional to the corresponding ordinates respectively for the stability curve of the given loading conditions; i.e., they will be rotated proportionally to the value: $GZ=q(\Delta,\theta)-KG.\sin\theta$. Shaft 32 will be rotated by a value proportional to the metacentric height (GZ), and particularly by a value proportional to the product $k.GM$ whereby, according to physical properties of aquatic vessels and operations performed by the gear cooperating with shaft 32, there results the equation $GM=KM-KG$.

The resultant shafts 26 and 32 are formed in the shape of lead screws for sliding nuts 27 and 33 mounted thereon. On these nuts are mounted journals 28 and 34.

Through all journals 28 and the zero-rotational journal 29 mounted at the beginning of the co-ordinate system for the projected stability curve is transversely and loosely threaded a flexible band 30, which in the form assumed due to its flexure projects the stability curve, i.e., the function of the type: $GZ=f(\theta, \Delta, KG)$ for the given loading conditions.

According to principles of naval architecture, the preliminary metacentric height GM corresponding to a straight position of a vessel is numerically equal to the tangent of angle of inclination $\alpha$ of the tangent to the curve of stability at the beginning of the co-ordinate system $\theta=0$.

The following solution can be applied in order to make the flexible band 30 run from the beginning of the co-ordinate system under the required angle of inclination $\alpha$ to the axis of the abscissae: the zero-journal 29 is in regard to its rotary position controlled by nut 33 which slides along shaft 32. Upon setting the shaft in the arrangement according to the invention into $k$ distance from the journal 29, expressed in radians with taking into account the diagram's scale of angle, it suffices for providing the angle to draw the nut 33 downwards or upwards from the axle (depending upon the magnitude of the mark GM) by a value proportional to the product $k.GM$.

According to previous explanations, the gear 14, cooperating with shaft 32, transmits on it rotations proportional to the product $k.GM$ and, as a result, in each case is provided the correct inclination of lever 35.

The arrangement according to the invention indicates in a similar way the angle's equivalent of the respective value of the metacentric height GM for the given loading condition, and independently of that the value is also indicated numerically by the left indicator screen on the sliding scale 19.

The height of point M on the sliding scale 19 is controlled by radial cam 7. For this purpose the rotational motion of the wheel 12, cooperating with the sliding toothed bar through the radial cam 7, is by means of conical ratio transmitted on the shaft 37. For conversion of rotations of the shaft 37, proportional to the product $k.KM$ into rotations proportional to the value KM, there is provided a pair of gear wheels 38 of tooth ratio $k:1$. The output shaft 39 on this shaft 37 slides, by means of nut 40, the sliding scale 19 together with the point M, which corresponds by its height to the actual value KM. Taking point M on the sliding scale 19 as the initial point for computing elevation of the metacenter over the gravity center, i.e., for computing the value GM and plotting on the sliding scale 19 a scale identical with that of value KG and with the direction of the increasing values reverse to scale 18 (KG), the arrangement according to the invention performs the mechanical operation of deduction: $KM-KG$, indicating with the pointer 17 the result of the operation, that is the respective value GM.

FIGS. 2 and 3 show the multiturn spatial radial cams 6 and 7 which operate the following way:

The radial cam 6 or 7 projects by means of its variable radius R (the changes are dependent upon the angle setting $\vartheta$ of the cam of which angles are proportional to the displacement) the cross-curve $q_0$ for the given vessel. The cam is encompassed from both sides by the cam follower's frame 9 which rests with its side gaps 41 on shaft 5. The frame is pressed in the direction of the cam by the spiral spring 42 wrapped around the pull rod 10. In frame 9, a roller 8 is situated for rolling in the cam's spiral track and for transferring the pressure of the cam follower's spring 42 to the cam's track. The tracks of the radial cam are framed with lips 43 forcing the roller 8 to perform axial sliding upon rotation of the cam. Roller 8 is situated in the frame 9 on a sliding pin 44 parallel to the shaft 5.

For the selection of scales and dimensions for the radial cams 6 and 7, the full values of ordinates of the cross-curves $q_0=f(\Delta)$ and also the curve $KM=f(\Delta)$ must not be taken into consideration but only those parts of them that are not subjected to fluctuations effected by the changes of displacement. This implies that every one of the above mentioned ordinates can become a subject of consideration from the position of the following diagram:

$$q_\theta = q_{\theta c} + q_{\theta v}(\Delta)$$

In that diagram $q_{\theta c}$ stands for the invariable (constant) part of the given ordinate and $$q_{\theta v}(\Delta)$$

for the variable part dependent upon displacement. According to this diagram with the help of radians of the spiral cams R can be projected only the variable parts of the above mentioned ordinates, by which the dimensions of the cams can be substantially reduced.

The arrangement according to the invention, presents the solution for industrial production of arrangements for universal sizes and types of vessels. For separate vessels or series of vessels, the radial cam 6 and 7 serving for projection of the geometric characteristics of certain types of vessels may need individualized manufacturing. In some cases also the indicator scales of the arrangement according to the invention may have to be individually manufactured.

It should be pointed out that during the construction of the arrangements according to the invention there will appear the necessity of accommodation of the adjustment range ($\Delta$ and KG) to the practical needs occurring in given operational form. However, there will be no need of securing in the arrangement according to the invention the capability for projection of the range of conversion, through which may be passing the stability curve under the effect of all theoretically possible combinations within the reserved adjustment ranges for $\Delta$ and KG. The scales of the result diagram and the associated dimensions of middle indicator screen, and also dimensions of the complete arrangement according to the invention, should in some respects be accommodated to such limited range of adjustment combinations with $\Delta$ and KG only, which can practically appear in operation of a given type of vessel.

For securing the arrangement according to the invention from damage caused by adjustment combinations ($\Delta$ and KG), transgressing the predicted a priori ranges it is necessary to apply at the construction of the arrangements an electric-signalling system, based on the principle of contact limiters for sliding all nuts of the type: 3, 17, 27, 34.

One of the outstanding features of the arrangement according to the invention is that it enables the ship master to receive in a quick and simple manner not only the complete set of individual numerical stability parameters of the given loading condition, but also the actual diagram of the respective function, that is the complete synthetic description of all elements of stability of the vessel at a given loading condition.

Due to these advantages; the arrangement according to the invention can in a wide range assist the master in finding out the most convenient solution for the loading operation and by same render the service of an analyzer of possible loading-stability problems.

What is claimed is:

1. Apparatus for establishing stability and loading relationships for a vessel, said apparatus comprising first and second input means for the entry of data respectively relating to vessel displacements and elevation of vessel center of gravity, means defining a graph for arms of static stability $GZ=f(\theta,\Delta,KG)$ wherein $\theta$=angle of vessel's transverse list, $\Delta$=vessel's displacement and KG= elevation of resultant center of gravity of loaded vessel in relation to keel point, said graph having an ordinate corresponding to GZ and an abscissa relating to $\theta$, a series of indicator means distributed along said abscissa, a series of cam means related to said indicator means and to angle of list and actuated by said first input means, and a series of adder means coupled to said cam means and second input means to displace said indicator means relative to said ordinate.

2. Apparatus as claimed in claim 1 comprising means between said second input and adder means to modify data transmitted to the latter as a function of sin $\theta$.

3. Apparatus as claimed in claim 1 comprising first and second supplemental scale means coupled to said first and second input means independently of the first said cam means to indicate data entered by said input means.

4. Apparatus as claimed in claim 1 comprising zero adjustment means coupled to said graph and to said input means to adjust the coordinates in respect of metacentric height.

5. Apparatus as claimed in claim 3 comprising means to adjust said supplemental second scale means in respect of metacentric height.

6. Apparatus as claimed in claim 1 comprising a flexible band connected to said indicator means and adapted to represent a curve.

7. Apparatus as claimed in claim 1 wherein said cam means each includes a rotatable cam having a spiral groove extending through more than 360° and a cam follower in said groove.

8. Apparatus as claimed in claim 7 wherein said adder means each include a rack attached to the associated cam follower, an envelope-type gear system, gears coupling the rack and system, and gears coupling the system and said second input means.

9. Apparatus as claimed in claim 7 wherein said cam follower comprises a frame straddling the cam and a roller on the frame and engaged in said groove.

References Cited

UNITED STATES PATENTS

| | | | |
|---|---|---|---|
| 1,861,192 | 5/1932 | Sander | 235—61 |
| 2,230,954 | 2/1941 | Jakosky | 235—61.3 |
| 2,657,857 | 11/1953 | Carreyette | 235—61 |
| 3,027,069 | 3/1962 | Heiberg | 235—61 |
| 3,116,637 | 1/1964 | Haas et al. | 73—172 |

OTHER REFERENCES

Leeming, Modern Ship Stowage, U.S. Government Printing Office, 1942, pp. 149–152.

RICHARD B. WILKINSON, *Primary Examiner*.

L. FRANKLIN, *Assistant Examiner*.